Patented Oct. 27, 1936

2,058,606

UNITED STATES PATENT OFFICE 2,058,606

COMPOUNDS OF THE VIOLANTHRONE SERIES AND A PROCESS OF MAKING THE SAME

William Hiram Lycan, Wilmington, Del., assignor to E. I. du Pont de Nemours & Company, Wilmington, Del., a corporation of Delaware No Drawing. Application June 2, 1934, Serial No. 728,721. Renewed July 15, 1936

10 Claims. (Cl. 260—61)

This invention relates to carbon compounds and more particularly to derivatives of violanthrone and their preparation. It especially appertains to the substances produced by treating violanthrones having free Bz2, Bz2' positions with an aldehyde (R—CHO), a carboxylic acid halide (R—CO—halogen), a di-halo-methyl compound (R—CH halogen$_2$, R—C halogen$_2$—R), a carboxylic acid anhydride

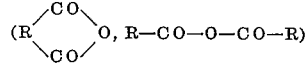

or a sulfonyl halide (R—SO$_2$—halogen), until one molecular proportion of the treating compounds has been reacted with one molecular proportion of the violanthrone and thereafter treating the mono substituted product with a nitrating substance.

It is well known by those skilled in the art that compounds known as benzanthrones are produced when compounds of the anthraquinone series are condensed with glycerine (see United States of America Patents 818,992 of April 24, 1906 and 809,892 of January 9, 1906 to Bally & Isler and 786,085 of March 28, 1905 to Bally). When benzanthrones are fused with caustic alkali under appropriate conditions there are produced compounds known as violanthrones (see for example Color Index 1099).

While the chemical structure of violanthrone is not positively known, it is generally believed to be as follows:

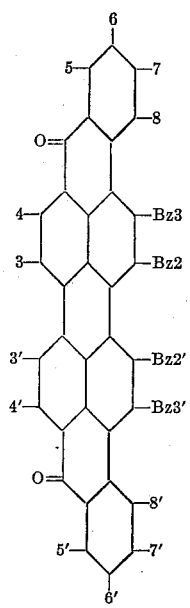

The numbers given in the formula are those usually assigned to the positions they adjoin.

Compounds having this general structure are powerful vat dyes. Since their discovery a tremendous amount of research work has been expended upon them. This work has developed the fact that two positions of such a nucleus are more reactive than the others. It is the general belief that the Bz2, Bz2' positions are the ones showing this particular activity.

In British #401,645 there is disclosed a process whereby violanthrones not substituted in the Bz2, Bz2' positions may be treated to produce mono substituted derivatives. Specifically in Example 2 thereof one molecule of violanthrone itself is condensed with one molecule of para-nitro-benzoyl chloride. In like manner in Example 5, a reaction between violanthrone and 1-chloro-anthraquinone-2-carbonyl chloride is disclosed and in Example 8 treatment of violanthrone with 1:9-anthrathiazol-2-carbonyl chloride is described. Mono substituted violanthrones are also obtained by a related process when carboxylic acid anhydrides are utilized. This is disclosed in the same British patent in Example 12. Treatment of violanthrones with aldehydes, sulfonyl halides and di-halo-methyl compounds under similar conditions also produces mono substituted compounds as is shown in Examples 1, 2, 3, 4 and 5 of this application.

It has now been found that new organic chemical compounds, new vat dyes, new vat colors, new colored carbon compounds, new intermediates, new vattable compositions of matter and new violanthrone derivatives may be produced by nitrating the aforementioned mono substituted violanthrones obtained by condensing (or reacting) one molecular proportion of a violanthrone having the Bz2, Bz2' positions free (or unoccupied).

This invention has for an object the preparation of new chemical compounds and new processes for the production of violanthrones. Other objects are the preparation of a new series of carbon compounds in a very desirable physical form and in a high state of purity. Still further objects are to produce new vat dyes, new derivatives of violanthrones and to devise new chemical processes. A general advance in the art and other objects which will appear hereinafter are also contemplated.

The foregoing objects and related ends are accomplished in the manner set out in the following description in which details of what is believed to be the best mode for carrying out the invention are disclosed.

Specifically one method for accomplishing the aforementioned objects and obtaining the newly discovered products is by nitrating mono substituted violanthrones resulting from treating violanthrones having free Bz2, Bz2' positions with the various reagents.

The invention will be further understood by a consideration of the following detailed description and illustrative specific examples in which the quantities are given in parts by weight.

Example I

Five hundred (500) parts of antimony trichloride were heated to 180° C. To this melt was added 250 parts of anhydrous aluminum chloride under agitation. During the addition the temperature dropped to 100°–120° C. It was raised to 150°–155° C. in order to permit the aluminum chloride to digest completely. When a clear solution was obtained the temperature was lowered to 100°–120° C. When this was accomplished 100 parts of violanthrone were introduced into the melt within a period of one half of one hour. The temperature was then allowed to drop to 95°–100° C. and 35–40 parts of metaldehyde $(CH_4O)_4$ were added in a period of 15–30 minutes. After a brief period of agitation the temperature was raised to 140°–150° C. and maintained within the said limits for approximately 4–6 hours. The smooth melt was then drowned in a cold solution of hydrochloric acid (containing 5–10% HCl), heated to 50–90° C. and subsequently filtered. The residue was washed with 2–5% hot hydrochloric acid and then with hot water until free of acid. The residual product, which was a dark blue paste, assumed, when dry, the physical appearance of a violet powder. Its sulphuric acid solution was reddish blue to blue. The new product dyes from blue to reddish blue alkaline hydrosulfite vat in pure blue shades which, when oxidized by exposure to the air, changed to bright blue shades. When dyed on cotton this new product produces shades which are exceedingly fast to chlorine, washing and sunlight. It may be used for printing purposes when prepared in paste form.

Example II

To a melt of 500 parts of antimony trichloride and 250 parts of anhydrous aluminum chloride, prepared in the same manner as set forth in Example I, there was added 100 parts of violanthrone while maintaining the temperature at 100–120° C. To this melt was further added 30–35 parts of ortho-chloro-benzaldehyde at 110–110° C. The addition of the aldehyde was carried out over a period of 30–45 minutes so as not to permit the temperature to rise too rapidly. When the ingredients were properly digested within the melt, the temperature was raised to 100°–200° C. and maintained within these limits for a period of 3–6 hours, after which time the fluid melt was drowned in a hydrochloric acid solution and the reaction product isolated in precisely the same manner as indicated in Example I. While this product has properties similar to those of the product of Example I, it dyes to slightly greener shades. It was noted that the alkaline hydrosulfite vat was characterized by a remarkable red fluorescence. Elementary analysis of the end product indicates that the chlorine atom has remained in the phenyl nucleus.

Example III

Six hundred (600) parts of anhydrous antimony trichloride, are heated to 180° C. and to this molten mass there were added under good agitation 300 parts of anhydrous aluminum chloride. This addition resulted in a decrease in temperature to 100–120° C. Heat was then applied and the temperature raised to 150–155° C. where it was held until the melt was completely homogeneous. The melt was allowed to cool to 95–100° C. and 100 parts of finely pulverized violanthrone were added over a period of 15–60 minutes. When the reaction was again homogeneous, and at the same temperature, 35–40 parts of benzene sulfonyl chloride were dropped slowly onto the surface of the melt over a period of 30–60 minutes. After a brief period of agitation, the temperature of the reaction mixture was raised to 140–180° C. and maintained within these limits for 2–6 hours. At the end of this time, condensation being complete, the entire reaction mass was drowned in cold solution of hydrochloric acid (containing 5–10% HCl). The resulting suspension was brought to a boil and subsequently filtered. Antimony and aluminum salts were removed from the residual cake by repeated washings with 2–5% hydrochloric acid solution in the hot and the acid was finally removed by washing with hot water. The product thus obtained, when dry, was a dark violet powder, which yielded a blue violet coloration in sulfuric acid. It gave a reddish-blue hydrosulfite vat from which cotton was dyed in reddish-blue shades, which turn to almost a pure blue upon oxidation in air. The dyeings are fast to chlorine, washing and sunlight. The product was found to be suitable for printing when made into an appropriate paste.

Example IV

A melt composed of 600 parts of anhydrous antimony trichloride and 300 parts of anhydrous aluminum chloride was prepared as described in the preceding example. To this melt at 95–100° C. there was added 100 parts of violanthrone and subsequently, at a similar temperature, 60–70 parts of anthraquinone-2-sulfonyl chloride were added over a period of 30–60 minutes. After agitating several minutes at this temperature, heat was applied and the reaction temperature raised to 150–180° C. It was maintained within these limits for 2–6 hours, after which time the condensation was complete. The reaction mass was then drowned in 5–10% hydrochloric acid solution and the product was obtained in a manner similar to that described in the preceding example. The new dyestuff thus obtained was a dark violet powder, the sulfuric acid solution of which is less reddish-blue than that of the product of the preceding example. It had somewhat greater strength upon dyeing but was very nearly of the same shade and brightness.

Example V

In a suitable receptacle, there was placed 500–600 parts of antimony trichloride and the same heated to 180° C. To this melt was added 250–300 parts of anhydrous aluminum chloride under agitation. During the addition the temperature dropped to 100°–120° C. It was raised to 150°–155° C. in order to permit the aluminum chloride to digest completely. When a clear solution was obtained the temperature was lowered to 100°–120° C. and 100 parts of finely powdered violanthrone were introduced over a period of one-half to one hour. Complete digestion was permitted to take place. This took place in approximately thirty minutes at 110°–120° C. When this was accomplished, 40–50 parts of ortho-chlorobenzal chloride were introduced into the melt at 90–100° C. at such a rate as not to allow the temperature to rise over 100°–105° C. When the addition was complete the temperature was cautiously raised to 140°–160° C. for a period of 2–4 hours. The smooth melt was then drowned in a cold solution of hydrochloric acid containing 5–10% HCl, heated to 50°–90° C. and subsequently filtered. The residue was washed with 2–5% hot hydrochloric acid and then with hot water until free of acid. The reaction apparently proceeds in such a manner as to allow the chlorine atom in the phenyl nucleus to remain intact. This fact is substantiated by an elementary analysis of the end product. The residual product which was a dark blue paste assumed, when dry, the physical appearance of a violet powder. Its sulphuric acid solution was reddish-blue to blue.

The new product dyes from a blue to reddish-blue alkaline hydrosulfite vat in pure blue shades which, when oxidized by exposure to air, change to bright blue shades. Its alkaline hydrosulfite vat is characterized by a remarkable red fluorescence. When dyed on cotton this new product produces shades which are extremely fast to chlorine, washing and sunlight. It may be used for printing purposes when prepared in paste form.

Example VI

Fifty (50) parts of the mono substituted violanthrone obtained by condensing violanthrone with 1-chloro-anthraquinone-2-carbonyl chloride in the presence of aluminum chloride, were suspended in 400 parts of ortho-di-chloro-benzene. The suspension was cooled and 25 parts of nitric acid of approximately 90% strength were added at temperatures below 20° C. while maintaining good agitation of the suspension. Heat was then applied and the temperature gradually raised to 75°–80° C. The temperature was held at this point for about 30–90 minutes, after which (the nitration being complete) the solvent was removed by steam distillation. The desired product was recovered by filtration and freed from acid and remaining traces of solvent by thorough washing, first with hot water and then with alcohol. There was obtained a reddish-black cake, which dyed cotton green from an alkaline hydrosulfite vat. The dyeings changed to a grey to black when treated with bleaching agents. It was found to be a valuable intermediate for the preparation of other new dyes. It was also found that the product could be reduced by the usual reducing agents, for example, sodium sulfide, sodium hydrosulfide and zinc and alkali.

One specific method of reducing the nitrated body which was found very satisfactory, involved suspending the wet cake of the nitrated body described above in a solution of 100 parts of sodium sulfide, 500 parts of alcohol and 2500 parts of water (these quantities are based on the amount of the original mono substituted violanthrone used as the intermediate) and heating from 2–6 hours under good agitation at refluxing temperatures. The resulting hot solution was then filtered giving a greenish black filter cake, which was washed free from alkali and sodium sulfide with hot water. In this manner the alkali soluble impurities were also removed and the final product obtained when dry was a finely divided greenish black powder. It is soluble in organic solvents and yields reddish violet solutions in 95% sulfuric acid with ease. It is also readily soluble in alkaline hydrosulfite vats from which it dyes cotton in blue shades which turn yellow green upon exposure to air. The resultant dyeings are fast to soaping and are converted to grey to black dyeings on treatment with bleaching agents. The new and valuable dyestuff thus obtained, may be employed in the preparation of other dyestuffs. The reactions of the new dye indicate that the molecule contains a free amino group.

Example VII

Fifty (50) parts of the mono substituted violanthrone, obtained by condensing violanthrone with 1:9-anthrathiazole-2-carbonyl chloride in the presence of aluminum chloride, were suspended in 400 parts of ortho-di-chloro-benzene. A process similar to that described in Example VI was then carried out. The resulting nitro and amino violanthrone derivatives gave somewhat more reddish violet shades in sulfuric acid than those of Example VI and dyed cotton in slightly yellower green shades from a hydrosulfite vat containing an alkali hydroxide.

Example VIII

In the manners described in Examples VI and VII, the mono substituted violanthrone obtained by condensing violanthrone with para-nitro-benzoyl chloride in the presence of aluminum chloride was nitrated and isolated. The nitrated product was a green-black powder which gave a red-violet coloration in sulfuric acid. It was found to be an excellent intermediate. If convenient or desired, the mono substituted violanthrone derivative used as an intermediate and containing the nitro group can be reduced before the above described nitration.

Example IX

In the manners described in Examples VI and VII, the mono substituted violanthrone, obtained by condensing violanthrone with anthraquinone-2-sulfonyl chloride in the presence of aluminum chloride, was also nitrated and reduced. The resultant products were green-black powders yielding red-violet solutions in sulfuric acid. The new products dye cotton in yellow-green shades, which are somewhat brighter than those described in the previous examples.

Example X

Twenty (20) parts of mono substituted violanthrone, obtained by condensing violanthrone with benzene sulfonyl chloride in the presence of aluminum chloride, were dissolved in 200 parts of 95% sulfuric acid at room temperature. To this solution there was added 5 parts of powdered sodium nitrate and the resulting solution agitated at room temperature for 15–20 hours. The temperature was then increased to about 50° C. for a few minutes after which the reaction mass was cooled and drowned in water. The product was filtered and the residual cake washed free from acid with hot water. The filter cake of the resulting nitrated body was reduced with sodium sulfide as described in Example VI.

There resulted a new amino derivative which dyed cotton from alkaline hydrosulfite vats in yellow-green shades which were yellower and brighter than any of the other products previously described.

The nitration may be carried out in other ways than those specifically described in the preceding examples. Furthermore, it is not limited to the specific reagents and conditions above set out. However, extreme variations from the preferred procedures and proportions are to be avoided in the interest of economy of time and materials. The well known nitrating media are suitable for the herein described process. Special mention may be made of phthalic anhydride, nitrobenzene and glacial acetic acid, in addition to the nitrating media named in the specific examples. For nitrations in ortho-di-chloro-benzene, which is a preferred solvent, the temperature range of 75-80° C. has been found the most satisfactory. Nitrations in nitrobenzene are usually carried out at 50-60° C. under good agitation. With glacial acetic acid nitrations it is desirable not to exceed a temperature of 60° C. and to stir well while approaching this temperature. In the case of phthalic anhydride the most desirable procedure involves the addition of the nitric acid at about 150° C. and maintenance of this temperature thereafter until nitration is complete. The temperature to be used with any particular solvent may be readily determined empirically.

In general for smoothness of operation it has been found satisfactory to add the nitric acid to the non-aqueous solvent suspensions at temperatures below 15° C. although cold nitrobenzene suspensions and room temperature glacial acetic acid suspensions give excellent results. In the case of any particular solvent the addition temperature may be varied from the exact figures given as previously indicated at the will of the person carrying out the reaction.

While fuming nitric acid has been mentioned for nitrating purposes in the non-aqueous solvent processes described above, it is permissible to vary the strength of the acid above and below 90% however, at the expense of the efficiency of the reaction. The acid strength depends largely upon the convenience of the operator and the character of the solvent being utilized.

In the case of nitrations carried out in sulfuric acid solutions, an amount of sulfuric acid equivalent to about ten times the material to be nitrated has been found convenient and is customarily used. In the case of nitrations in non-aqueous media the preferred ratio of suspension medium to material to be nitrated is about 8 to 1. The wider range involving from 4 to 20 times as much suspension medium as compound to be nitrated has been found to give very satisfactory results with either type of suspension media. Greater or lesser proportions may be used when indicated by the particular conditions encountered.

In all cases, the amount of nitrating substance added should, of course, be sufficient to furnish the requisite number of nitro groups. An excess of the nitrating body is apparently not deleterious to the substance being treated. Usually .4 to .7 parts of nitric acid are used for each part of the material to be nitrated.

As many apparently widely different embodiments of this invention may be made without departing from the spirit and scope thereof, it is to be understood that I do not limit myself to the specific embodiments thereof except as defined in the appended claims.

I claim:

1. The process which comprises condensing a member of the group consisting of carbonyl halides, sulfonyl halides, aldehydes, carboxylic acid anhydrides and di-halo-methyl carbon compounds with a violanthrone having the Bz2, Bz2' positions free and thereafter nitrating the product.

2. The product obtainable by condensing a member of the group consisting of carbonyl halides, sulfonyl halides and aldehydes, carboxylic acid anhydrides and di-halo-methyl carbon compounds with a violanthrone having the Bz2, Bz2' positions free and thereafter nitrating the product.

3. In the process of preparing vat dyes the step of nitrating the mono-substituted violanthrone obtainable by condensing a violanthrone having the Bz2, Bz2' positions unoccupied with one molecular proportion of a member of the group consisting of carbonyl halides, sulfonyl halides, aldehydes, carboxylic acid anhydrides and di-halomethyl carbon compounds.

4. The product obtainable by nitrating the mono-substituted violanthrone obtainable by condensing a violanthrone having the Bz2, Bz2' positions unoccupied with one molecular proportion of 1-chloro-anthraquinone-2-carbonyl chloride in the presence of aluminum chloride.

5. The product obtainable by nitrating the monosubstituted violanthrone obtainable by condensing a violanthrone having the Bz2, Bz2' positions unoccupied with one molecular proportion of para-nitro-benzoyl-chloride in the presence of aluminum chloride.

6. The product obtainable by nitrating the mono-substituted violanthrone obtainable by condensing a violanthrone having the Bz2, Bz2' positions unoccupied with one molecular proportion of anthraquinone-2-sulfonyl-chloride in the presence of aluminum chloride.

7. The process which comprises condensing only one molecular proportion of 1-chloro-anthraquinone-2-carbonyl chloride with a violanthrone having the Bz2, Bz2' position unoccupied, suspending 50 parts of the resultant in 400 parts of ortho-di-chloro-benzene, cooling the resultant mixture, adding 25 parts of 90% nitric acid while maintaining a temperature below 20° C., gradually raising the temperature to 75°-80° C., holding the temperature at this point for 30-90 minutes, steam distilling off the ortho-di-chloro-benzene, filtering the resultant and washing the same.

8. In the process of preparing vat colors the step of nitrating the mono-substituted violanthrone obtainable by condensing violanthrone with one molecular proportion of 1-chloro-anthraquinone-2-carbonyl chloride.

9. In the process of preparing vat colors the step of nitrating the mono-substituted violanthrone obtainable by condensing violanthrone with one molecular proportion of para-nitro-benzoyl-chloride.

10. In the process of preparing vat colors the step of nitrating the mono-substituted violanthrone obtainable by condensing violanthrone with one molecular proportion of anthraquinone-2-sulfonyl-chloride.

WILLIAM H. LYCAN.

CERTIFICATE OF CORRECTION.

Patent No. 2,058,606.

October 27, 1936

WILLIAM HIRAM LYCAN.

It is hereby certified that error appears in the printed specification the above numbered patent requiring correction as follows: Page 2, first column, line 17, for the words "of one hour" read to one hour; and line 49 for "110-110° C." read 100-110° C.; and that the said Letters Patent should be read with these corrections therein that the same may conform to the record of the case in the Patent Office.

Signed and sealed this 2nd day of March, A. D. 1937.

(Seal)

Henry Van Arsdale
Acting Commissioner of Patents.